United States Patent
Nagai

(10) Patent No.: US 7,542,823 B2
(45) Date of Patent: Jun. 2, 2009

(54) ZONE CONTROLLED CONVEYOR SYSTEM AND A ZONE CONTROLLER FOR USE THEREIN

(75) Inventor: Yoshinori Nagai, Kakogawa (JP)

(73) Assignee: Itoh Denki Co., Ltd., Hyogo (JP)

( * ) Notice: Subject to any disclaimer, the term of this patent is extended or adjusted under 35 U.S.C. 154(b) by 225 days.

(21) Appl. No.: 10/920,599

(22) Filed: Aug. 16, 2004

(65) Prior Publication Data
US 2005/0065641 A1    Mar. 24, 2005

(30) Foreign Application Priority Data
Aug. 25, 2003    (JP)    ............................ 2003-300249

(51) Int. Cl.
G06F 7/00    (2006.01)
B65G 43/00    (2006.01)
B65G 47/26    (2006.01)
B65G 47/31    (2006.01)
B65G 13/06    (2006.01)

(52) U.S. Cl. ............... 700/230; 198/460.1; 198/781.05; 198/781.06

(58) Field of Classification Search ................. 700/213, 700/228, 230; 198/781.06, 781.1, 571, 572, 198/575, 577, 579, 461.1, 334, 341.03, 341.09, 198/444, 459.8, 460.1
See application file for complete search history.

(56) References Cited

U.S. PATENT DOCUMENTS

| | | | |
|---|---|---|---|
| 4,355,712 A * | 10/1982 | Bruno ..................... | 198/459.6 |
| 5,318,167 A | 6/1994 | Bronson et al. | |
| 5,341,916 A * | 8/1994 | Doane et al. ............. | 198/460.1 |
| 5,814,772 A * | 9/1998 | Nishimura et al. .......... | 177/145 |
| 6,459,224 B2 * | 10/2002 | Itoh et al. .................... | 318/445 |
| 6,827,202 B2 * | 12/2004 | Topmiller et al. ...... | 198/781.05 |
| 6,843,362 B2 * | 1/2005 | Tachibana et al. ......... | 198/460.1 |
| 6,860,381 B2 * | 3/2005 | Newsom et al. ........ | 198/781.05 |
| 6,873,882 B2 * | 3/2005 | Tachibana et al. ........... | 700/230 |
| 7,016,768 B2 * | 3/2006 | Grafer et al. ................. | 700/230 |
| 2003/0135299 A1 | 7/2003 | Tachibana et al. | |
| 2004/0003982 A1 | 1/2004 | Tachibana et al. | |

FOREIGN PATENT DOCUMENTS

| DE | 29911067 | 9/1999 |
|---|---|---|
| JP | 62-230516 | 10/1987 |
| JP | 11-199030 | 7/1999 |

* cited by examiner

*Primary Examiner*—Gene Crawford
*Assistant Examiner*—Ramya G Prakasam
(74) *Attorney, Agent, or Firm*—Wood, Phillips, Katz, Clark & Mortimer

(57) ABSTRACT

The invention aims to provide a zone controlled conveyor system including a plurality of zones for control. A zone controlled conveyor system, while conveyance of any article from a zone to a downstream zone is forbidden, (a) starts operation of a driving roller in the zone at a first conveying speed slower than a prescribed standard conveying speed upon detection of a presence of an article from an immediately upstream zone of the zone, (b) operates the driving roller at a second conveying speed slower than the first conveying speed after arrival of the article at a predetermined position in the zone, and (c) halts operation of the driving roller upon detection of a presence of the article in the zone. Thereby, the system enables to stop articles at a target position accurately.

20 Claims, 12 Drawing Sheets

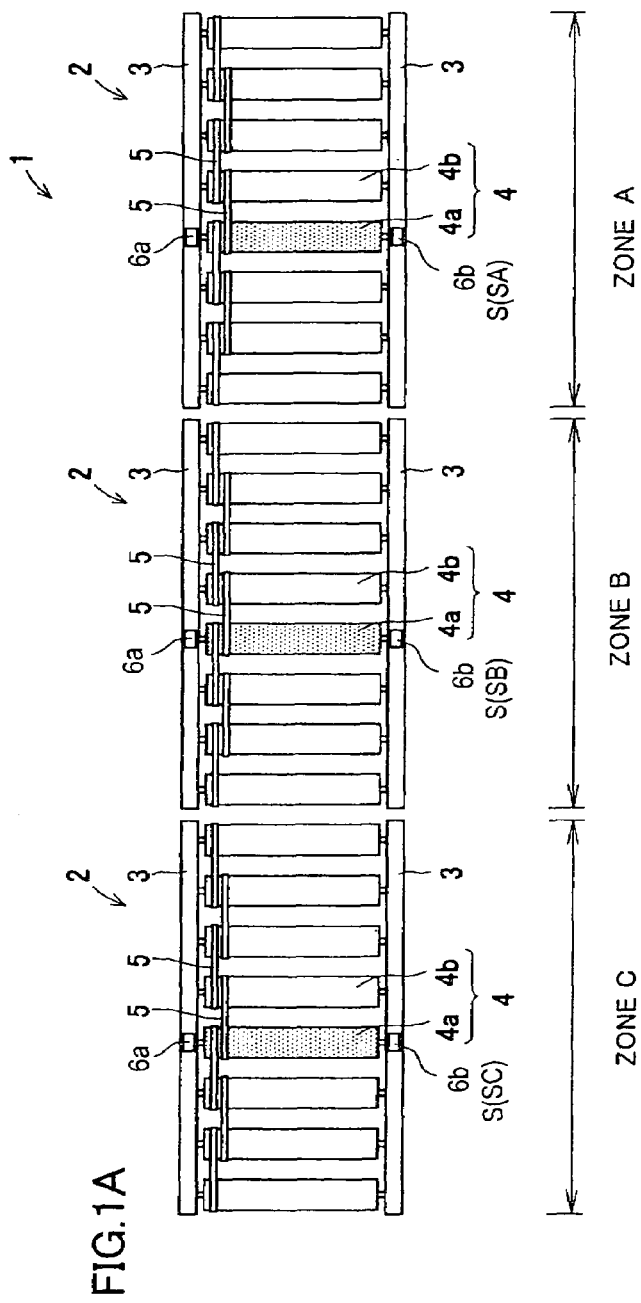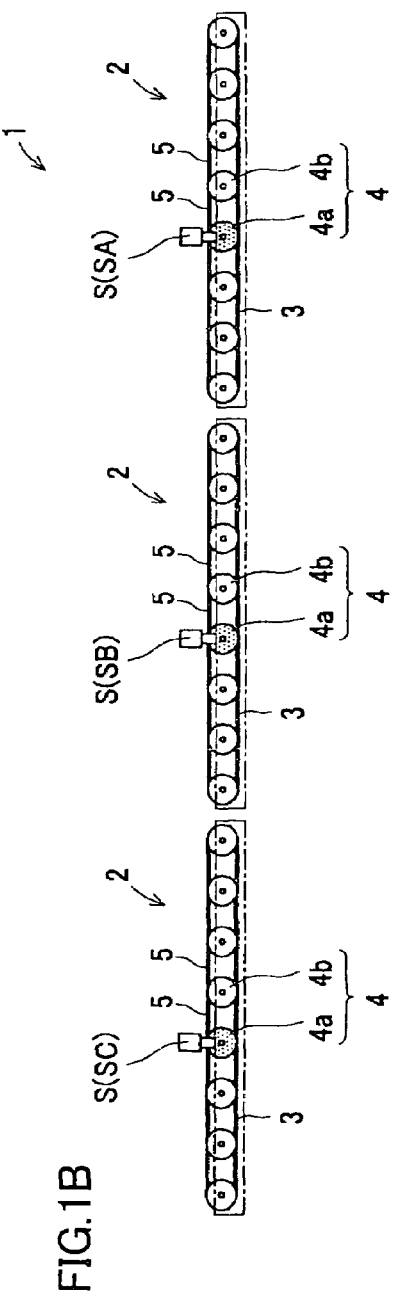

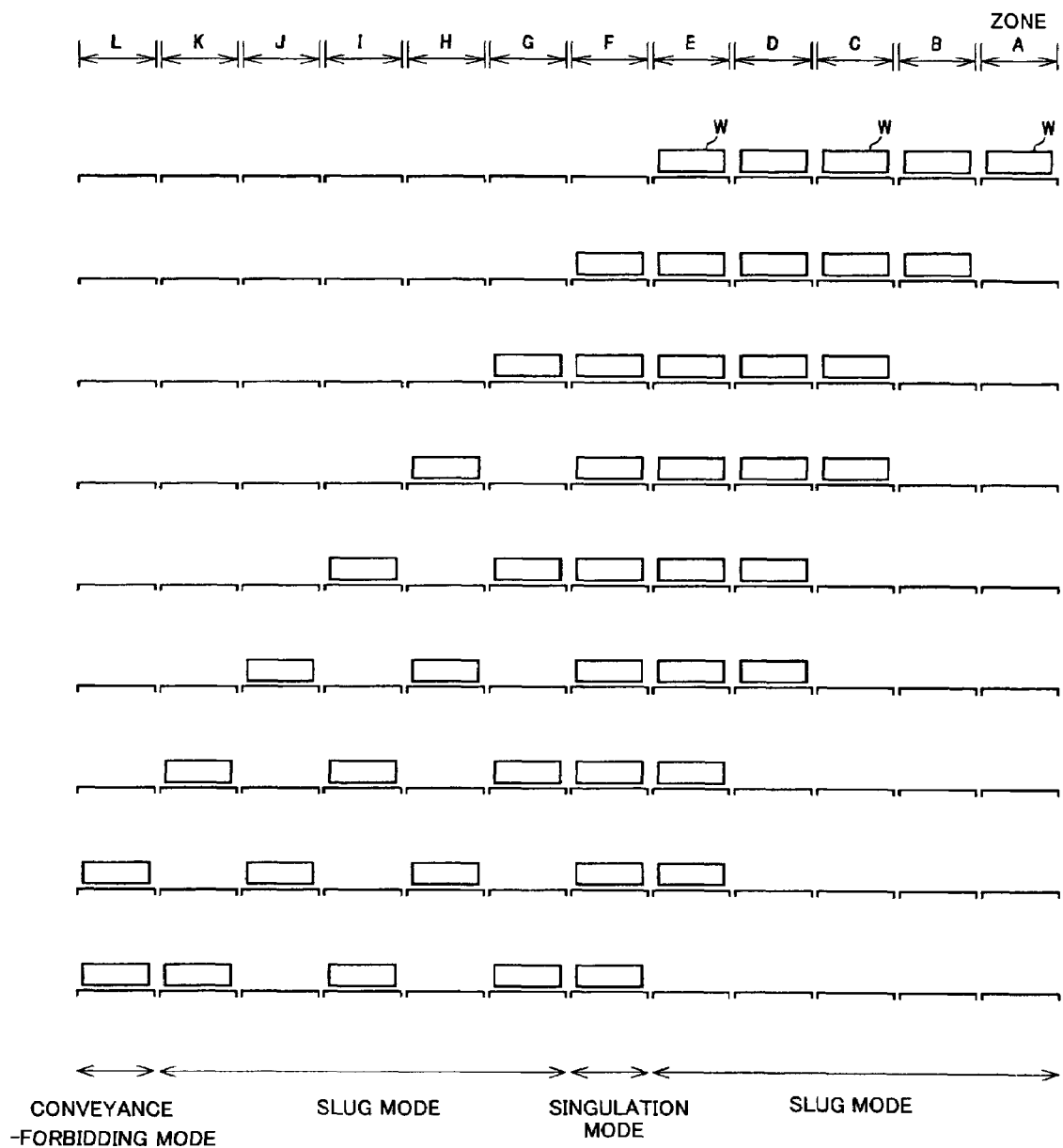

|←— ZONE D —→|←— ZONE C —→|←— ZONE B —→|←— ZONE A —→|

STARTING CONVEYANCE
AT A FIRST CONVEYING SPEED

SLUG MODE

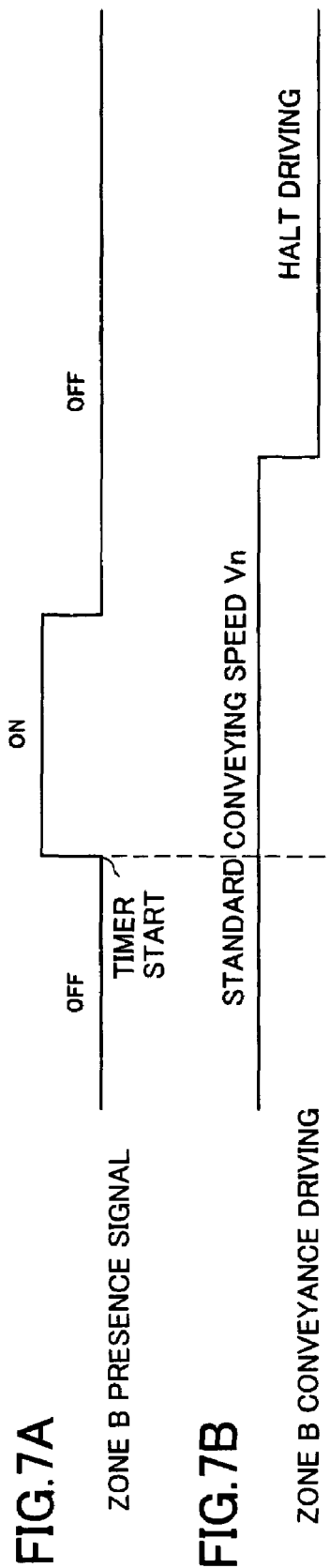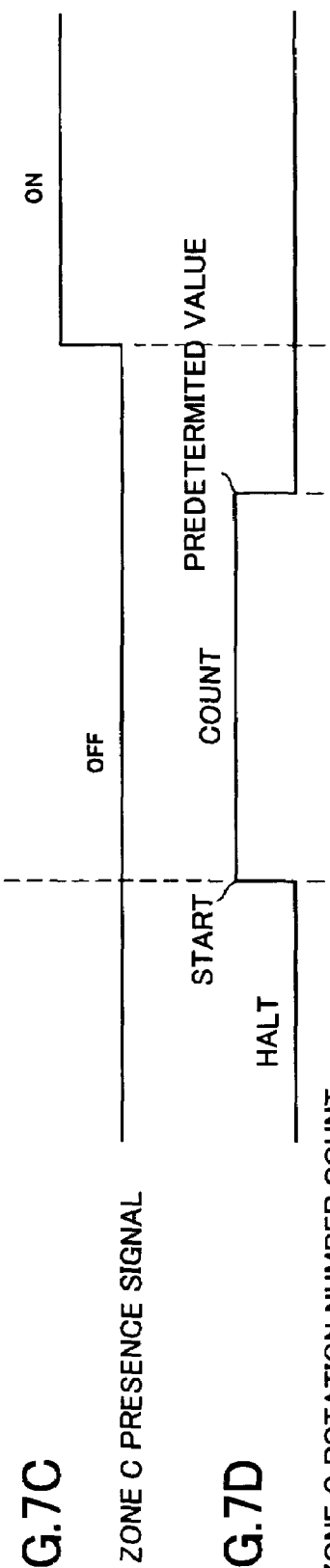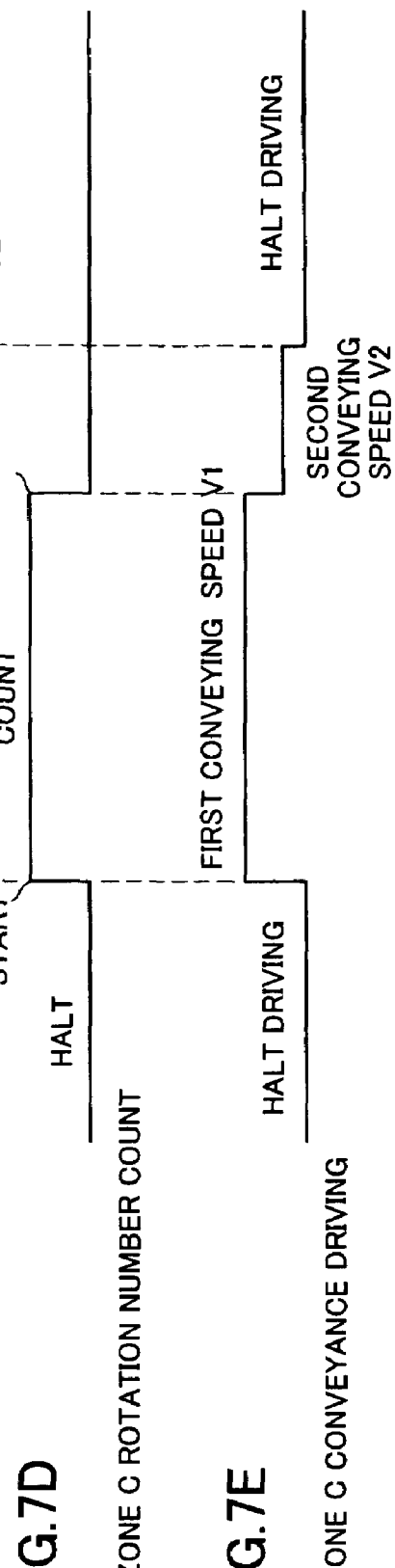

|← ZONE E →|← ZONE D →|← ZONE C →|← ZONE B →|← ZONE A →|

STARTING CONVEYANCE AT A FIRST CONVEYING SPEED

STARTING CONVEYANCE AT A FIRST CONVEYING SPEED

←——————— SLUG MODE ———————→ ←— SINGULATION MODE —→

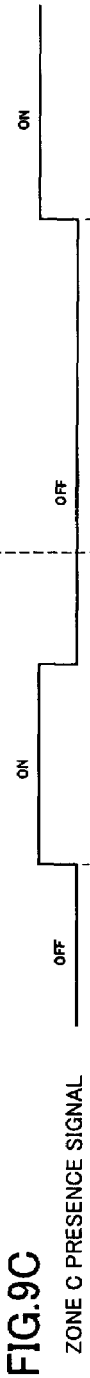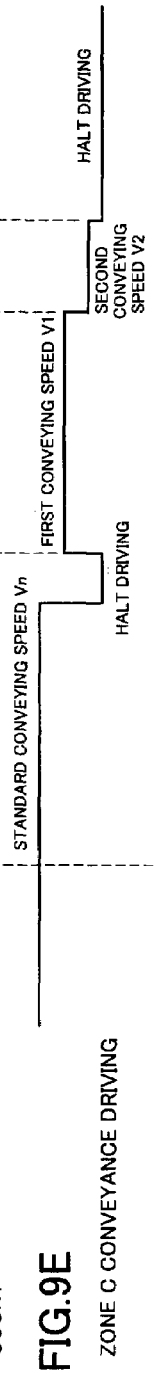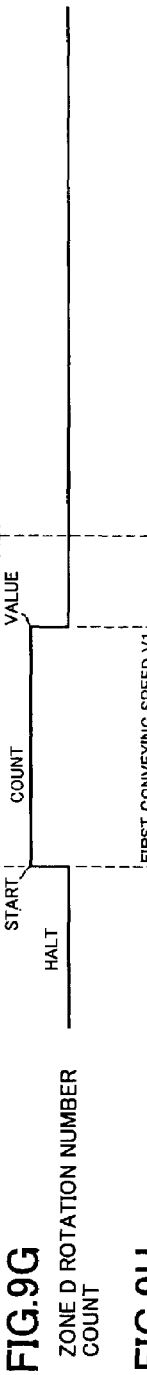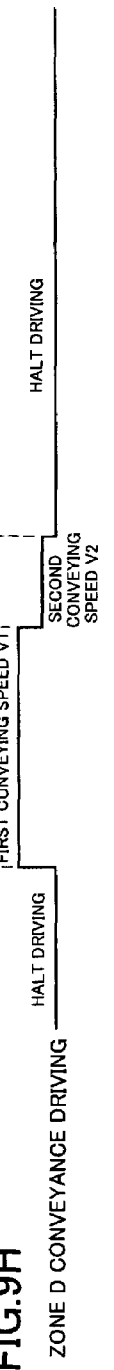
FIG.9A ZONE B PRESENCE SIGNAL
FIG.9B ZONE B CONVEYANCE DRIVING
FIG.9C ZONE C PRESENCE SIGNAL
FIG.9D ZONE C ROTATION NUMBER COUNT
FIG.9E ZONE C CONVEYANCE DRIVING
FIG.9F ZONE D PRESENCE SIGNAL
FIG.9G ZONE D ROTATION NUMBER COUNT
FIG.9H ZONE D CONVEYANCE DRIVING

ZONE CONTROLLED CONVEYOR SYSTEM AND A ZONE CONTROLLER FOR USE THEREIN

BACKGROUND OF THE INVENTION

1. Field of the Invention

The present invention relates to a zone controlled conveyor system, and more specifically to a system for the purpose of enabling an accurate stop of an article at a target position. Further, the present invention relates to an improvement of a zone controller for use in the zone controlled conveyor system.

2. Description of the Related Art

Recently, a zone controlled conveyor system that has a conveying line consisting of a plurality of control zones (zones for control), each zone having a zone controller for controlling conveyance of articles has been developed.

A patent document 1 specified below discloses such a conveyor system.

The conventional conveyor system that is disclosed in the patent document 1 includes at least one driving roller and free rollers for conveyance connected by belts spanned over them in each unit. Each unit has a presence sensor for detecting the presence of an article and a zone controller for controlling operation of the driving roller.

The zone controllers of each unit, connected electrically to others, drives and halts operation of the driving roller depending on presence signals of an article of its home control zone (i.e., the zone corresponding to the zone controller) and taking into account signals such as the presence signal transmitted from upstream and downstream control zones. That is, according to the conventional system, such cooperative control by zone controllers achieves the "zero-pressure accumulating control" that enables articles avoiding collision therebetween.

Patent Document 1: Japanese Laid-Open Patent Application No. Hei. 11-199030.

However, the conventional system has caused problems in relation to a halt of articles.

As to the conventional system, in order to stop an article, when the sensor detects it, it makes an abrupt stop of the driving roller that is driven at a prescribed standard conveying speed at that time. An unexpected inertial force resulting from the abrupt stop of the driving roller acts on the article, so that the inertial force of the article turns the driving roller that has been stopped being driven, hindering a stable stop of the article at the target position.

Further, due to the inertia force acted on an article by the abrupt stop of the driving roller, the article slips on the conveyor, increasing instability of its stop position.

Still further, as to the conventional system, due to an ununiform friction between an article and the roller, the article irregularly slips on the conveyor, hindering uniform orientations of the stopped article.

The invention disclosed in the application is proposed in consideration of the above-mentioned situations, aiming to provide a zone controlled conveyor system that enables an accurate and stable stop of articles at a target position. Further, the present invention is proposed aiming to provide a zone controller for suitable use in the zone controlled conveyor system.

SUMMARY OF THE INVENTION

An aspect of the present invention proposed for achieving the aim described above is a zone controlled conveyor system including a plurality of zones for control arranged in a row in the direction of conveyance of articles, each of the zones having a driving roller for generating power for conveyance, a zone controller for controlling operation of the driving roller, and a presence sensor for outputting a presence signal upon detection of an article, wherein each of the zone controllers is adapted to receive signals for controlling operation of the driving roller, wherein each of the zone controllers is adapted to switch a conveying speed of an article driven by the driving roller among a plurality of speeds including a prescribed standard conveying speed, and wherein the zone controllers are arranged so that while conveyance of any article from a particular zone to a downstream zone is forbidden, the zone controller for the particular zone (a) starts operation of a driving roller in the particular zone at a first conveying speed slower than the standard conveying speed upon transmission of a presence signal of an article to the zone controller from an immediately upstream zone of the particular zone, (b) operates the driving roller at a second conveying speed slower than the first conveying speed after arrival of the article at a predetermined position in the particular zone, and (c) then halts operation of the driving roller when a presence signal is outputted in the particular zone.

Another aspect of the present invention proposed for achieving the aim described above is a zone controller for use in a conveyor system having a plurality of zones for control arranged in a row in the direction of conveyance of articles and provided in one of the zones, wherein the zone controller is for controlling operation of a driving roller provided in the zones for generating power for conveyance, wherein the zone controller is adapted to receive presence signals from presence sensors provided in a particular zone having the zone controller and an immediately upstream zone of the particular zone each for outputting a presence signal upon detection of an article, wherein the zone controller is also adapted to switch a conveying speed of an article driven by the driving roller among a plurality of speeds including a prescribed standard conveying speed, a first conveying speed slower than the standard conveying speed and a second conveying speed slower than the first conveying speed, and wherein the zone controllers are arranged so that while conveyance of any article from the particular zone to a downstream zone is forbidden, the zone controller for the particular zone (a) starts operation of the driving roller in the particular zone at the first conveying speed upon transmission of a presence signal of an article to the zone controller from an immediately upstream zone of the particular zone, (b) operates the driving roller at the second conveying speed after arrival of the articles at a predetermined position in the particular zone, and (c) then halts operation of the driving roller when a presence signal is outputted in the particular zone.

In the present aspect, while conveyance of any article from a particular zone to a downstream zone is forbidden, and when articles are detected in an immediately upstream zone of the particular zone, the zone controller starts operation of the driving roller in the particular zone at the first conveying speed for receiving the articles conveyed from upstream. After arrival of the article at a predetermined position in the particular zone, the zone controller operates the driving roller at the second conveying speed. When an article is detected by the sensor in the particular zone, the zone controller halts operation of the driving roller.

Under those controls, when conveyance-forbidding of the articles from the particular zone to a downstream zone is removed, the zone controller restarts conveyance to downstream by operating the driving roller at the standard conveying speed.

In other words, the present aspect does not abruptly stop articles conveyed at the standard conveying speed at a particular zone for stopping them, but does stop them after gradually reducing speed from the standard conveying speed to the first and the second conveying speeds.

Consequently, setting the second conveying speed just before stopping an article to a low degree reduces an inertial force acting on the article of which conveyance is stopped. Such construction protects the driving roller of which operation is halted from undesired turning by the inertial force and achieves a stable stop of articles at a target position.

Further, the reduction of the inertial force protects the articles from irregular slips on the driving roller, thereby protecting orientations of the articles from nonuniform moving by a friction.

In the present aspect, a predetermined position to switch a conveying speed of the driving roller to the second conveying speed may be set upstream of a position capable of stably reducing a conveying speed of the driving roller from the first to the second conveying speeds while an article is conveyed from the predetermined position to the stop position where the article is detected by the sensor.

A still another aspect of the present invention proposed for achieving the aim described above is a zone controlled conveyor system including a plurality of zones for control arranged in a row in the direction of conveyance of articles, each of the zones having a driving roller for generating power for conveyance, a zone controller for controlling operation of the driving roller, and a presence sensor for outputting a presence signal upon detection of an article, wherein each of the zone controllers is adapted to receive signals for controlling operation of the driving roller, wherein each of the zone controllers is adapted to switch a conveying speed of an article driven by the driving roller among a plurality of speeds including a prescribed standard conveying speed, wherein each of the zone controllers includes a mode-setting means adapted to switch mode of control between a slug mode and a singulation mode, operation of the driving roller being controlled in the slug mode so that articles in the zones are conveyed uniformly to downstream, maintaining the order of the articles in the conveying line, operation of the driving roller being controlled in the singulation mode so that articles are conveyed separately to downstream with a predetermined number of zones in which no article exists kept between the zones in which the articles exist, and wherein the zone controllers are arranged so that while conveyance of any article from a particular zone to a downstream zone is forbidden, and when articles are conveyed to an immediately upstream zone of the particular zone in the slug mode, the zone controller for a zone selected from zones upstream of the immediately upstream zone is switched to the singulation mode, and the zone controller for the particular zone (a) starts operation of a driving roller in the particular zone at a first conveying speed slower than the standard conveying speed upon transmission of a presence signal of an article to the zone controller from an immediately upstream zone of the particular zone, (b) operates the driving roller at a second conveying speed slower than the first conveying speed after arrival of the articles at a predetermined position in the particular zone, and (c) then halts operation of the driving roller when a presence signal is outputted in the particular zone.

The present aspect has a zone controller provided in one of the zones in the aspects described above, to which a mode-setting means adapted to switch mode of control between a slug mode and a singulation mode is added.

In the case that a plurality of articles are sequentially conveyed from upstream in the slug mode, an immediately upstream zone of a particular zone for stopping the article also becomes a zone for stopping the article conveyed from a further immediately upstream zone.

Consequently, in order to apply such control for stopping as the present aspect to the case that a plurality of articles are sequentially conveyed from upstream in the slug mode, it requires a control for stopping the article not only in the particular zone but also in the immediately upstream zone.

Thus, not only in the particular zone but also in the immediately upstream zone, a different control from that for conveyance of articles at the standard conveying speed is required, resulting in requiring a remarkably complicated control for stopping.

In the present aspect, by a zone set in the singulation mode, articles are conveyed separately to downstream with a predetermined number of zones in which no article exists kept between the zones in which the articles exist. Thereby, at a time point that articles are arrived at an immediately upstream zone of the particular zone for stopping the articles, a zone in which no article exists is made in a further immediately upstream zone of the upstream zone. Such an arrangement enables to readily achieve a control for stopping of the present aspect without a complicated control.

It is preferable that the zone controller is capable of outputting the presence signal from the sensor of the particular zone and a driving status signal that indicates driving status of the roller to the immediately upstream and downstream zones, that the zone controller for the particular zone set in the slug mode conveys uniformly the articles referring to the presence signal of the particular zone, the presence signals outputted from the immediately upstream and downstream zones of the particular zone, and the driving status signal outputted from the immediately downstream zone of the particular zone, and that the zone controller for the particular zone set in the singulation mode conveys separately the articles referring to the presence signal in the particular zone and the presence signals outputted from the immediately upstream and downstream zones of the particular zone.

By the zone controller set in the slug mode in a particular zone, the following control is performed taking into account the signals. When a status of the driving roller in the immediately downstream zone is "run", the driving roller in the particular zone is driven, if any article exists in either or both of the particular zone and the immediately upstream zone. When a status of the driving roller in the immediately downstream zone is "halt", the driving roller in the particular zone is driven, if articles exist in both of the immediately upstream and downstream zones and no article exists in the particular zone, or if no article exists in the immediately downstream zone and any article exists in either or both of the particular zone and the immediately upstream zone.

Thus controls by the zone controller readily achieve a slug mode conveyance.

By the zone controller set in the singulation mode in a particular zone, the following control is performed taking into account the signals. The driving roller in the particular zone is driven, when any article exists in the immediately downstream zone, if no article exists in the particular zone and any article exists in the immediately upstream zone. The driving roller in the particular zone is driven, when no article exists in the immediately downstream zone, if any article exists in either or both of the particular zone and the immediately upstream zone.

Thus controls by the zone controller readily achieve a singulation mode conveyance.

It is preferable that each of the zone controllers for the zones is connected to a supervisory controller adapted to output a mode-switching signal according to conveying states of articles so that each of the zone controllers is automatically switchable between the slug mode and the singulation mode on receiving the mode-switching signal transmitted from the supervisory controller. A zone controller may be connected to the supervisory controller directly or through other controllers.

When a particular zone for stopping articles exists, according to conveying states, the supervisory controller perceives the number of the articles that sequentially stop at the immediately upstream zone of the particular zone. Consequently, it is possible to automatically select a zone set in the singulation mode depending on the number of the articles.

Thus, a control for stopping of the present invention employed in the particular zone and the immediately upstream zone effects to sequentially stop articles.

The zone controller employed in any aspect of the invention is preferably adapted to switch the conveying speed gradually or stepwise.

In this construction, from starting at the first conveying speed until switching to the second conveying speed, the speed may be reduced gradually or stepwise from the first speed.

Such arrangement reduces a transitional difference of the conveying speed when switching to the second speed and an inertial force acting on articles when switching the conveying speed, so as to prevent articles from slipping on a conveyor when switching the conveying speed and to effect a smooth control for stopping.

A presence sensor for detecting whether an article exists may employ a mechanical switch. That is, the sensor may detect the presence of an article in the form of "ON" and "OFF" (or "OPEN" and "CLOSE") of a mechanical switch, provided in the conveyor line and turned on and/or off by the article conveyed on the line. However, the sensor employing such a mechanical switch has disadvantages of not being durable and taking time for maintenance. A mechanical switch, further, must be fixed in such a manner as coming in contact with articles on the line.

That is why the sensor is preferably a photoelectric sensor formed by a combination of a light-emitting member and a light-receiving member.

The photoelectric sensor detects the presence or absence of an article without contact, thereby extremely readily attaching on the line. A further advantage of the photoelectric sensor is its high durability. The photoelectric sensor may be of a transmission type with a light-emitting member and a light-receiving member facing mutually so as to place articles therebetween or of a reflection type that receives light emitted from a light-emitting member and reflected from an article, at a light-receiving member.

The zone controller is preferably adapted to transmit a driving signal and a braking signal simultaneously to a motor for driving the driving roller so as to reduce the conveying speed of the roller.

Such arrangement achieves reduction of a rotational speed with transmitting the driving and braking signals simultaneously to the motor until the rotational speed of the driving roller is reduced to a predetermined value if the rotational speed has increased due to such as an external force.

In this way, it makes possible to reduce the rotational speed to a target speed smoothly in a shorter time and to obtain a more stable conveying speed of articles, compared with a case of changing only a power supply to the motor.

The first conveying speed is preferably set to substantially a mean value between the standard and the second conveying speed.

The present aspect may substantially equalize both of differences of the conveying speeds for switching from the standard conveying speed to the first conveying speed when an article is conveyed from an immediately upstream zone to a particular zone, and for switching from the first conveying speed to the second conveying speed within the particular zone.

Thereby, an inertial force acting on an article when conveying the article to an immediately downstream zone and when switching the conveying speed in order to effect a stopping control is reduced, thereby effecting a smooth control for stopping.

It is preferable that the zone controller includes a means for counting a rotation number of one selected from the roller and a motor driving the roller, wherein the zone controller assumes an arrival of an article at the predetermined position in the zone when obtaining a predetermined integrated value of the rotation number counted by the counting means after starting driving the roller at the first speed.

At a particular zone, as long as no article slips on the driving roller and the roller maintains the first conveying speed, the articles are conveyed at the first speed.

As a result, when obtaining a predetermined integrated value of the rotation number of one selected from the driving roller and the motor counted after starting driving the roller at the first speed, the article is always located at a same position in the particular zone.

By the present construction, counting the rotation number of one selected from the driving roller and the motor by the counting means enables to assume exactly that an article is arrived at a predetermined position.

It is preferable that the zone controller includes a timekeeping means, wherein the zone controller assumes an arrival of an article at the predetermined position in the zone after passage of a predetermined time from starting driving of the roller at the first speed.

As described above, at the particular zone, as long as no article slips on the roller and the roller maintains the first conveying speed, the articles are conveyed at the first speed.

As a result, at the particular zone, after passage of the predetermined time from starting driving of the roller at the first speed, the article is always located at a same position in the particular zone.

By the present construction, measuring the passage of the predetermined time by the timekeeping means enables to assume exactly that an article is arrived at a predetermined position.

It is preferable that the zone controller includes a position sensor for detecting an arrival of an article at a predetermined position, wherein the zone controller perceives the arrival when receiving a position signal from the sensor.

Such a structure enables to perceive directly the arrival of an article at the predetermined position by the position sensor. Even if the article slips on the roller or the conveying speed of the roller is reduced due to a load of the article, the present construction exactly perceives the arrival of the article at the predetermined position and effects a stable control for stopping.

BRIEF DESCRIPTION OF THE DRAWINGS

FIG. 1A is a plan view of an embodiment of a conveyor line of a zone controlled conveyor system according to the present invention;

FIG. 1B is a side view of the conveyor line shown in FIG. 1A

FIG. 5 is a diagram illustrating a conveyance set in a singulation mode performed in the conveyor line shown in FIG. 1A;

FIG. 7A is a timing diagram showing an output of a presence signal in the zone B in the process to stop the article shown in FIGS. 6A-6E;

FIG. 7B is a timing diagram showing a conveying state in the zone B in the process shown in FIGS. 6A-6E;

FIG. 7C is a timing diagram showing an output of a presence signal in the zone C in the process shown in FIGS. 6A-6E;

FIG. 7D is a timing diagram showing an operation of a counting means for a rotation number of the zone controller in the zone C in the process shown in FIGS. 6A-6E;

FIG. 7E is a timing diagram showing a conveying state in the zone C in the process shown in FIGS. 6A-6E;

FIG. 9A is a timing diagram showing an output of a presence signal in the zone B in the process to stop the articles shown in FIGS. 8A-8I;

FIG. 9B is a timing diagram showing a conveying state in the zone B in the process shown in FIGS. 8A-8I;

FIG. 9C is a timing diagram showing an output of a presence signal in the zone C in the process shown in FIGS. 8A-8I;

FIG. 9D is a timing diagram showing an operation of a counting means for a rotation number of the zone controller in the zone C in the process shown in FIGS. 8A-8I;

FIG. 9E is a timing diagram showing a conveying state in the zone C in the process shown in FIGS. 8A-8I;

FIG. 9F is a timing diagram showing an output of a presence signal in the zone D in the process shown in FIGS. 8A-8I;

FIG. 9G is a timing diagram showing an operation of a counting means of a rotation number of the zone controller in the zone D in the process shown in FIGS. 8A-8I;

FIG. 9H is a timing diagram showing a conveying state in the zone D in the process shown in FIGS. 8A-8I;

DESCRIPTION OF THE PREFERRED EMBODIMENTS

Figure 2:
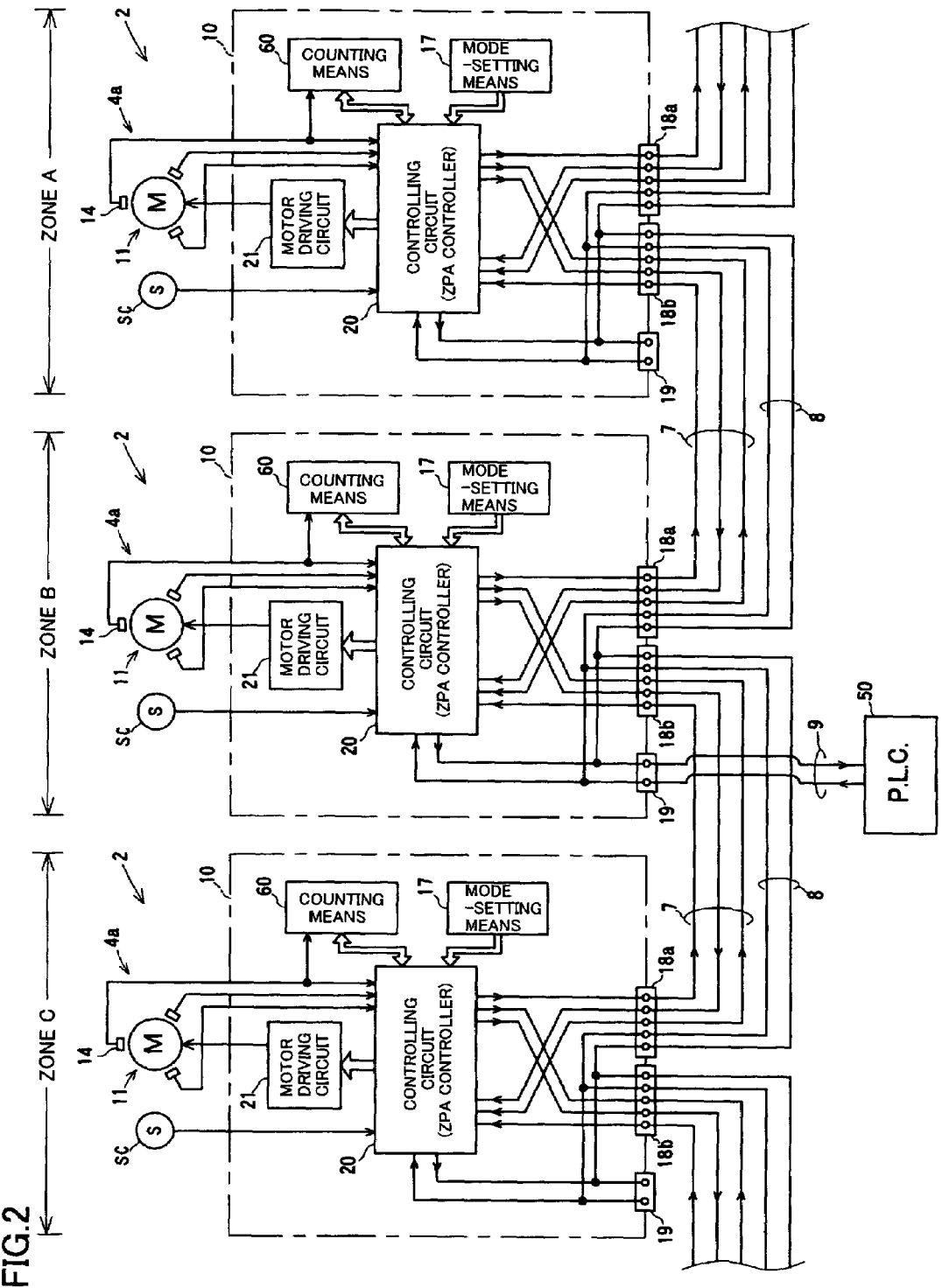
FIG. 2 is a block diagram and a wiring diagram of zone controllers incorporated in each of zones of the conveyor line shown in FIG. 1A.

Now a preferred embodiment of the present invention will be described referring to the accompanying drawings.

Referring to FIGS. 1A and 1B, a conveyor system (or a conveyor line) 1 is divided into a plurality of control zones including zones A, B and C, each zone having a conveyor unit 2. Each of the conveyor units 2 is made up of a plurality of conveying rollers 4, for conveying articles thereon, which are supported rotatably each through a shaft and between a pair of side frames 3, 3, positioned parallel on each side. The rollers 4 are arranged in a row in the direction of conveyance at predetermined equal intervals. The rollers 4 consist of a driving roller 4a (or motorized roller) that incorporates a driving motor for conveyance and free rollers 4b that can rotate freely. Driving belts 5 are spanned over each adjoining rollers 4 so as to transmit driving forces of the driving roller 4a to all the free rollers 4b. In this embodiment, one driving roller 4a is positioned at the substantially central part of each unit 2, the other rollers being free rollers 4b.

In the units 2, presence sensors S (SA, SB and SC) are attached to the side frames 3 respectively. A photoelectric sensor is employed as the sensor, formed by a combination of a light-emitting device (or light-emitting member) 6a and a light-receiving device (or light-receiving member) 6b, the former being attached to one of the side frames 3 and the latter being attached to the opposed side frame 3.

In this embodiment, the sensor S, attached to a substantially central position in the conveying direction in the unit 2 (viz. near to the driving roller 4a), such that the light-emitting device 6a faces with the light-receiving device 6b, detects whether the leading end of an article in the conveying direction has reached to the substantially central position in the conveying direction in the unit 2.

The sensor S is a photoelectric sensor of transmission type, in which a light emitted from the light-emitting device 6a to the light-receiving device 6b is intercepted by a conveyed article, thereby detecting arrival of the article at a predetermined position where the sensor is attached. Output of the sensor S is used as a presence signal indicating whether an article exists in the zones A, B and C.

Any other device emitting and receiving a visible light or an infrared ray may be employed as the sensor S. Instead of the photoelectric sensor of transmission type in this embodiment, a photoelectric sensor of reflection type, that detects a light emitted from a light-emitting device and reflected from an article by a light-receiving device, may be used as the sensor S.

Referring to FIG. 2, a zone controller 10 for controlling operation of a motor 11 incorporated in the driving roller 4a is provided in each of the units 2. Signal cables 7 and 8 connect between the adjoining zone controllers 10. A supervisory controller (P. L. C.) 50 is connected to a zone controller 10 for a particular zone (the zone B in FIG. 2) via signal cables 9.

The zone controller 10 generates a driving signal for the motor 11 taking into account at least one signal selected from the presence signal detected at the sensor S, a driving status signal indicating driving status of the motor 11, a signal transmitted from the adjoining zone controllers 10 via the signal cables 7 and 8, and a signal transmitted from the supervisory controller 50 via the signal cables 9.

Referring to FIG. 2, the zone controller 10 includes a controlling circuit 20, a motor driving circuit 21, a mode-setting means 17 and a counting means 60 for a rotation number. Each of the zone controller 10 also has an upstream connector 18a, a downstream connector 18b and a supervisory connector 19, each for mutually transmitting signals to and from other zone controllers 10 and the supervisory controller 50.

The controlling circuit 20, including a ZPA controller for performing a zero-pressure accumulating control (ZPA control), generates a driving signal for driving the motor 11 taking into account signals consisting of the presence signal outputted from the sensor S, a detection signal of a Hall effect sensor (pole-position detector) 14 provided in the motor 11, and signals transmitted via the upstream connector 18a and the downstream connector 18b, so as to generate a driving signal for driving the motor 11 to output to the motor driving circuit 21.

Further, the controlling circuit 20, upon reception of external output signals from the supervisory controller 50, that is, a conveyance command signal (RUN/STOP signal) and a conveyance direction command signal (CW/CCW signal), generates a driving signal for driving the motor 11 to output to the motor driving circuit 21. The controlling circuit 20 also generates a braking signal for braking the motor 11.

The motor driving circuit 21 drives and brakes the motor 11 upon reception of the driving signal and the braking signal transmitted from the controlling circuit 20.

The counting means 60 for the rotation number counts the rotation number of the motor 11 based on the detection signal of the Hall effect sensor 14 in response to instruction of the controlling circuit 20 and outputs a signal to the controlling circuit 20 when obtaining a predetermined integrated value of the rotation number.

The mode-setting means 17 sets the selection of signals to be taken into account in the controlling circuit 20. More specifically, the mode-setting means 14 can switch and set a slug mode, a singulation mode, and a conveyance-forbidding mode, so that signals to be taken into account in accordance with the setting are inputted to the controlling circuit 20.

Signals that should be transmitted and received between the adjoining zone controllers 10 may be determined at user's discretion. In the conveyor system 1 of this embodiment, as shown in FIG. 2, the presence signal and the driving status signal of the zone B are transmitted to the upstream zone A via the upstream connector 118a of the zone B, and the presence signal of the upstream zone A is transmitted to the zone B via the upstream connector 18a of the zone B. On the other hand, the presence signal of the zone B is transmitted to the downstream zone C via the downstream connector 18b of the zone B, and the presence signal and the driving status signal of the downstream zone C is transmitted to the zone B via the downstream connector 18b of the zone B.

The command signals (RUN/STOP signal and CW/CCW signal) outputted from the supervisory controller 50 (P. L. C.) are transmitted via the signal cables 9 to the supervisory connector 19 of the zone controller 10 for the zone B, and further transmitted via the upstream connector 18a and the downstream connector 18b each of the zone controller 10 for the zone B to all the zone controllers in the system 1.

In the conveyor system 1 of this embodiment, operation states of each of the units 2 are transmitted via the signal cables 9 to the supervisory controller 50 to be centrally controlled. The supervisory controller 50 outputs the command signals (external output signal) such as the conveyance command signal (RUN/STOP signal) for deciding whether to operate or halt each of the units 2 and the conveyance direction command signal (CW/CCW signal), by which signals the whole conveyor line 1 formed by the units 2 is controlled.

Each of the zones A, B and C in the line independently controls operation depending on the detection signal from the sensor S of each zone and the signals from the immediately upstream and downstream zones and simultaneously effects cooperative conveyance as the line.

Figure 3:
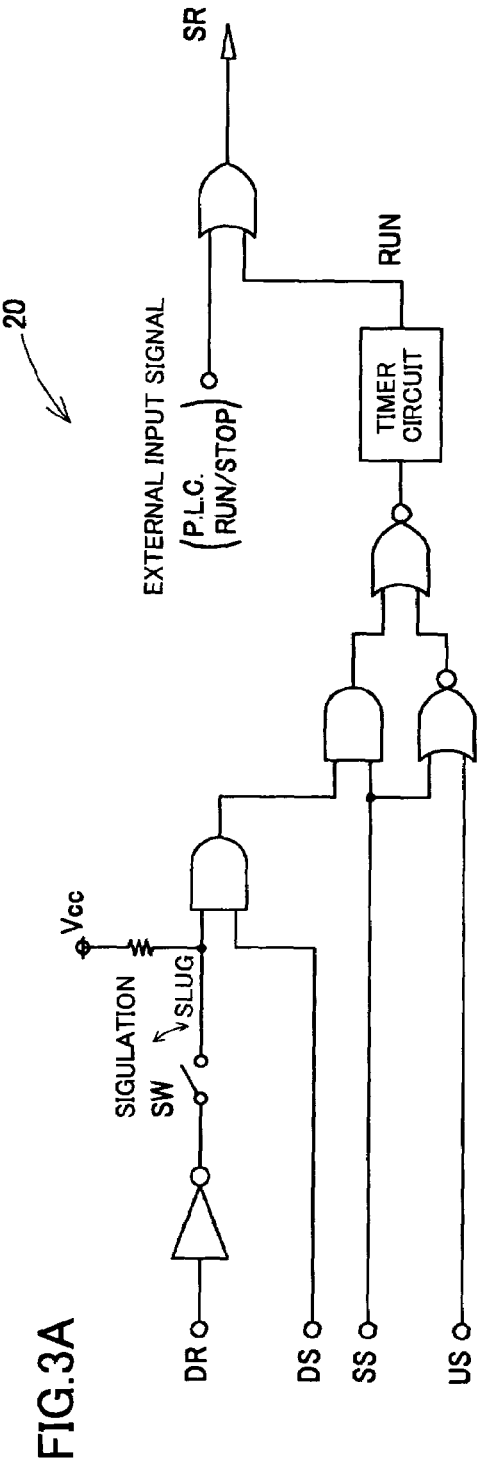
FIG. 3A is a circuit diagram showing a logic circuit generating a driving signal of the zone controller shown in FIG. 2.
FIG. 3B is a table of logical values of the logical circuit shown in FIG. 3A.

Referring to FIG. 3A, the controlling circuit 20 of the zone controller 10 includes a logical circuit for generating a driving signal for the roller 4a.

The logical circuit generates a driving signal (RUN signal) for driving the motor 11, based on the presence signal SS detected at the zone B in FIG. 2, the presence signal US transmitted from the upstream zone A, and the presence signal and the driving status signal DR, both transmitted from the downstream zone C.

The driving signal (RUN signal) thus generated is added to the conveying command signal (RUN/STOP signal) transmitted from the supervisory controller (P. L. C.) to yield logical sum, which is in turn outputted as a driving signal SR of the zone B so as to drive the motor 11 of the zone B. The driving signal SR is outputted to the upstream zone A so as to be used as the driving status signal DR.

In other words, the conveyance command signal (RUN/STOP signal) transmitted from the supervisory controller 50 compulsorily actuates the motor 11 of each zone and, when the conveying command signal (RUN/STOP signal) is not transmitted from the supervisory controller 50, a control in each zone is performed in accordance with the driving signal (RUN signal) generated by the zone controller 10 in each zone.

A timer circuit in the logical circuit in FIG. 3A maintains the driving signal (RUN signal) generated by the logical circuit for a predetermined duration. In other words, the timer circuit is for conveying the article conveyed from the upstream zone A to the zone B without fail and for conveying the article in the zone B to the downstream zone C without fail. In this embodiment, the maintaining duration of the timer circuit is set equivalent to that required for the article to be conveyed from a substantially central position of the zone B to a substantially central position of the zone C.

The logical circuit shown in FIG. 3A is constructed by combining an AND circuit, an OR circuit, a NOR circuit and a NOT circuit, and has a mode-setting switch (mode-setting means) SW. A slug mode is set when the mode-setting switch SW is closed, whereas a singulation mode is set when the mode-setting switch SW is opened. Logical signals (RUN signals) shown in the table of logical values in FIG. 3B are obtained as outputs in the slug mode and the singulation mode. Operation in each mode is as follows:

(The Slug Mode)

(1) With the driving roller 4a in the downstream zone C in a "run" status (with the driving status signal DR at H level), the driving roller 4a of the home zone B (i.e., the zone corresponding to the particular zone controller) is driven if any article exists in either or both of the home zone B and the upstream zone A.

(2) With the driving roller 4a in the downstream zone C in a "halt" status (with the driving status signal DR at L level), the driving roller 4a of the home zone B is driven if any article exists both in the upstream zone A and the downstream zone C and not in the home zone B, and if no article exists in the downstream zone C, the driving roller 4a of the home zone B is driven if any article exists in either or both of the home zone B and the upstream zone A.

(The Singulation Mode)

(1) With any article in the downstream zone C, the driving roller 4a of the home zone B is driven if no article exists in the home zone B and any article exists in the upstream zone A.

(2) With no article in the downstream zone C, the driving roller 4a of the home zone B is driven if any article exists in either or both of the home zone B and the upstream zone A.

(A Conveyance-forbidding Mode)

A conveyance-forbidding mode operates in accordance with the logical output at L level of the driving status signal DR and at H level of the presence signal DS each of the downstream zone C, in either or both of the slug mode and the singulation mode in the logical circuit shown in FIG. 3A.

If a zone is set in the conveyance-forbidding mode, the driving roller 4a of the home zone B is driven only when no article exists in the home zone B and any article exists in the upstream zone A, thus forbidding conveyance to downstream in all the case except the above-mentioned case.

The invention is not limited to the embodiment described herein. The conveyance-forbidding mode may be embodied by providing a mode-setting switch in the logical circuit shown in FIG. 3A to fix the logical output of the driving status signal DR at L level and that of the presence signal DS at H level, each of the downstream zone C. The invention may be further embodied, for example, by compulsorily applying signals at L level and H level to terminals for the driving status signal DR and the presence signal DS respectively, in the input section of the downstream connector 18b of the zone controller 10.

Now, operations of the zone controlled conveyor system 1 in this embodiment of the present invention will be described referring to the accompanying drawings.

Basic operation of the conveyor system 1 is required for a control for stopping of the conveyor system 1 in the present invention. Therefore, before the description in detail of the control for stopping, the operation of the system 1, that is, conveyances of articles set in the slug mode and in the singulation mode performed based on the driving signals generated by the logical circuit shown in FIG. 3A will be described referring to FIGS. 4 and 5.

Figure 4:
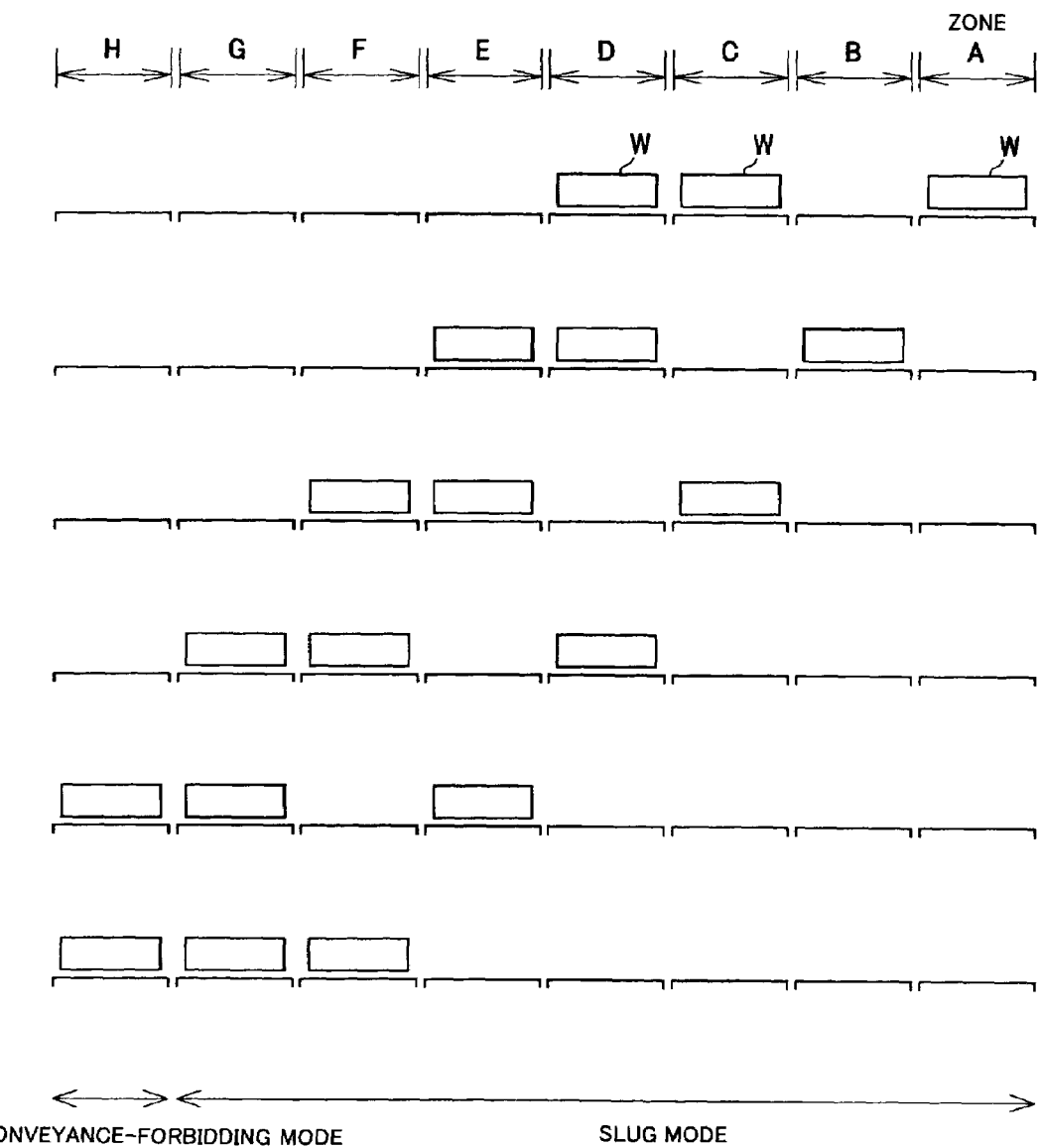
FIG. 4 is a diagram illustrating a conveyance set in a slug mode performed in the conveyor line shown in FIG. 1A.

In FIGS. 4 and 5, it is assumed that the right of the conveyor line is the upstream and the left thereof is the downstream, and that the zone in downstream end is set in the conveyance-forbidding mode.

In the logical circuit shown in FIG. 3A, a slug mode is set when the mode-setting switch SW is closed. Referring to FIG. 4, in the slug mode, if three articles W come to the zones D, C, and A one after another, the three articles W are conveyed downstream uniformly maintaining their arrangement order, that is, with constant intervals of the three articles W. However, since conveying downstream is forbidden in the zone H set in the conveyance-forbidding mode, after arrival of one of the three articles W at the zone H, the rest of the articles W are conveyed so as to be held in the immediately upstream zones without substantial intervals, thus achieving a zero-pressure accumulating conveyance. As seen in FIG. 4, thus efficient conveyance is achieved by the conveyor line 1 that has the zones set in the slug mode, with the driving rollers 4a of the zones except the zone for stopping articles driven at a prescribed standard conveying speed.

In the logical circuit shown in FIG. 3A, a singulation mode is set when the mode-setting switch SW is opened. In the conveyor line 1 shown in FIG. 5, the zone F is set in the singulation mode, whereas the zone L in downstream end is set in the conveyance-forbidding mode, the rest of the zones being set in the slug mode.

In the conveyor line 1 of this arrangement, as seen in FIG. 5, the zones set in the slug mode convey articles W, which have been conveyed continuously from upstream, with no intervals to downstream uniformly. In the zone F set in the singulation mode, articles W are conveyed to downstream in a manner restricted in particular conditions.

More specifically, according to the conditions of conveyance in the singulation mode, if an article W exists in the zone F and another article W exists in the downstream zone G, conveyance of the article W in the zone F is halted until the article W in the downstream zone G is conveyed out to the further downstream zone H. Thus zones downstream of the zone F that is set in the singulation mode are made into zones carrying articles W and zones not carrying articles W alternately, so that the articles are conveyed to downstream uniformly, maintaining this arrangement order. As seen in FIG. 5, the conveyor line 1 having particular zone set in the singulation mode and the rest of the zones set in the slug mode achieves conveyance, with operating the driving roller at the standard conveying speed in the zones except the zone for stopping an article W.

Also in this conveyor line 1, if an article W come to the zone L in downstream end, conveyance to downstream is forbidden. Other conveyed articles W are held on the immediately upstream zones set in the slug mode, without intervals, thus achieving the zero-pressure accumulating conveyance. As shown above, by setting the zone controller 10 for the particular zone in the singulation mode, articles having conveyed with substantially no intervals or with intervals each consisting of a zone and distributed randomly can be conveyed regularly with substantial intervals, with zones each having an article and zones having no article arranged alternately.

The basic operation of the conveyor system 1 of this embodiment is described above. Then, a control for stopping in this embodiment of the present invention will be described in detail, referring to FIGS. 6A to 6E and 7A to 7E.

In the conveyor line 1 in FIGS. 6A to 6E, it is assumed that the zones A to D are set each in the slug mode, and that conveyance in the zone D in downstream end is forbidden because an article rests in the immediately downstream zone.

In the conveyor line in FIGS. 6A to 6E, it is necessary to stop a work W in the zone C in case that the work W is conveyed from the upstream zone A.

Figure 6A:
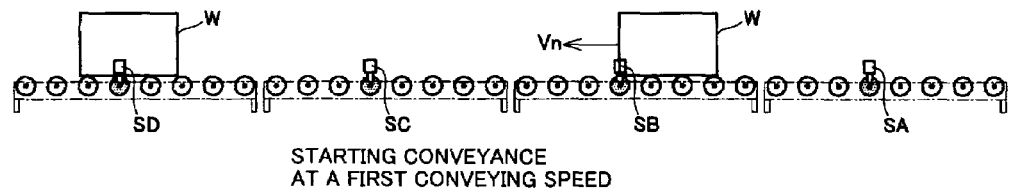
FIG. 6A is a diagram illustrating a first conveying state in the process to stop one article conveyed in the conveyor line shown in FIG. 1A.
Figure 6B:
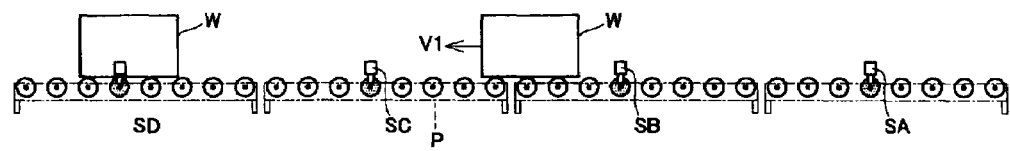
FIG. 6B is a diagram illustrating a second conveying state continuing to the state shown in FIG. 6A.
Figure 6C:
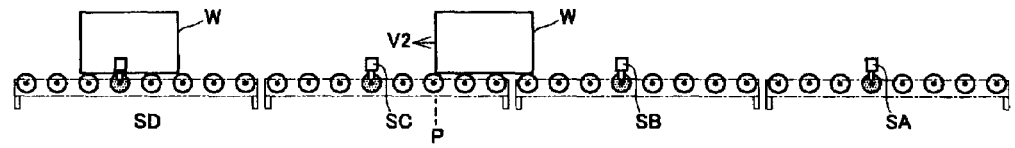
FIG. 6C is a diagram illustrating a third conveying state continuing to the state shown in FIG. 6B.
Figure 6D:
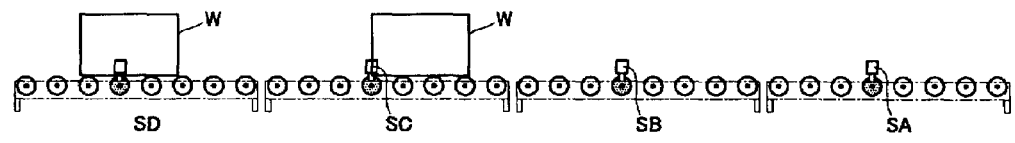
FIG. 6D is a diagram illustrating a fourth conveying state continuing to the state shown in FIG. 6C.
Figure 6E:
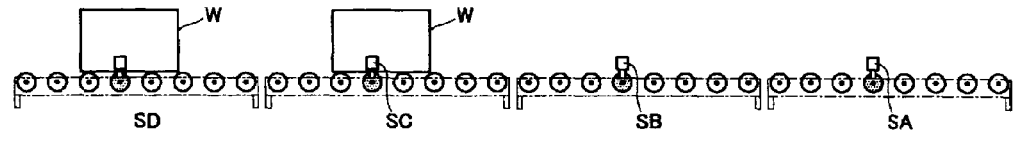
FIG. 6E is a diagram illustrating a state in which the article is stopped continuing to the state shown in FIG. 6D.

When the work W is conveyed to the zone B at the standard conveying speed Vn, the sensor SB in the zone B detects its presence signal, thereby the zone controller 10 for the zone C starts operation of the driving roller 4a at the first conveying speed V1 slower than the standard speed Vn (Refer to FIGS. 6A, 7A and 7E).

The zone controller 10 for the zone C starts to count the rotation number of the motor 11 by the counting means 60 for the rotation number, upon starting operation of the driving roller 4a (Refer to FIGS. 6A, 7A and 7D).

More specifically, this situation occurs on the way that the work W is being conveyed from the zone B to the downstream zone C, thus the zone C starting operation of the driving roller 4a at the first speed V1 for the purpose of receiving the work W conveyed from the zone B.

On the way that the work W is conveyed from the zone B to the zone C, when obtaining the predetermined integrated value of the rotation number counted at the counting means 60 in the zone C, the controlling circuit 20 in the zone C reduces the conveying speed of the driving roller 4a from the first speed V1 to the second speed V2 slower than the first speed V1 (Refer to FIGS. 6B, 6C, 7D and 7E).

More specifically, this situation occurs on arrival of the work W at the predetermined position P in the zone C, thus reducing the conveying speed from the first speed V1 to the second speed V2 for preparation of a halt of conveyance.

During conveyance of the work W in the zone C at the second speed V2, when the sensor SC detects its presence signal in the zone C, the zone controller 10 halts operation of the driving roller 4a (Refer to FIGS. 6C, 6D, 7C and 7E). According to the halt of operation, the driving roller 4a reduces the speed to stop, thus stopping the work W at the position slightly downstream of the detecting position by the sensor SC (Refer to FIG. 6E).

While conveyance of the work W to downstream is forbidden in the zone D in downstream end, the control for stopping described above is performed. Restarting conveyance of the work W resting in the zone D to downstream ceases a series of the control for stopping and restarts conveyance at the standard speed Vn in each of the zones set in the conveyance mode respectively.

The conveyor system 1 of this embodiment effects a stopping control in response to the detection by the sensor SC after reducing the conveying speed from the first speed V1 slower than the standard speed Vn to the second speed V2 slower than the first speed V1, in the zone C for stopping conveyance of the work W. Consequently, the inertial force acting on work W along with stopping operation of the driving roller 4a is extremely reduced, thereby enabling the stop position of work W to be stabled, compared with an abrupt stop of conveyance at the standard speed Vn, further protecting work W from slipping on the driving roller 4a and from stopping in irregular orientation.

Applying the control for stopping of this invention achieves an efficient conveyance of a plurality of works W one after another, though the conveyor line 1 shown in FIG. 6A exemplifies the process of conveyance of one work W. Operation of a control for stopping in the case of conveyance of a plurality of works W one after another will be described below, referring to FIGS. 8A to 8I and 9A to 9H. FIGS. 8A to 8I illustrate a process of conveyance of a plurality of articles by the control for stopping performed in the conveyor line 1 shown in FIG. 1B.

Figure 8A:
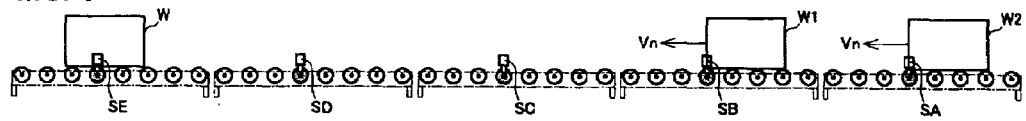
FIG. 8A is a diagram illustrating a first conveying state in the process to stop two articles conveyed in the conveyor line shown in FIG. 1A.

In the conveyor line 1 in FIG. 8A, it is assumed that the zone A in upstream end is set in the singulation mode and the zones B to E are set in the slug mode, and that conveyance in the zone E in downstream end is forbidden because an article rests in the immediately downstream zone.

Figure 8B:
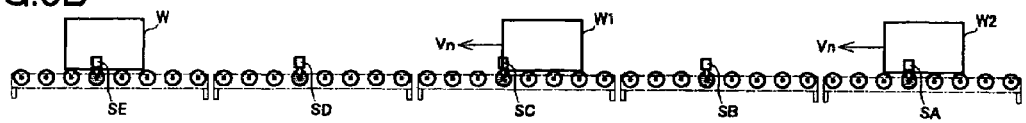
FIG. 8B is a diagram illustrating a second conveying state continuing to the state shown in FIG. 8A.
Figure 8C:
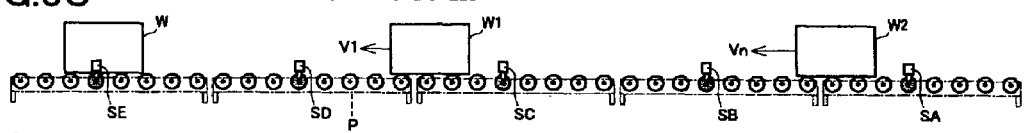
FIG. 8C is a diagram illustrating a third conveying state continuing to the state shown in FIG. 8B.
Figure 8D:
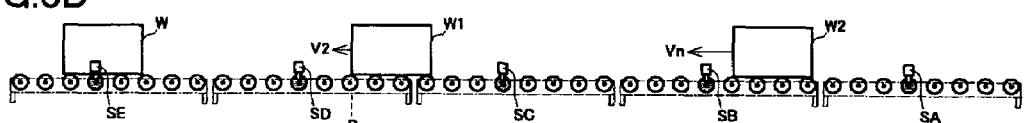
FIG. 8D is a diagram illustrating a fourth conveying state continuing to the state shown in FIG. 8C.

As seen in FIG. 8A, when works W1 and W2 are conveyed to the zones A and B one after another, the zone A set in the singulation mode halts conveyance of the work W2 until the Work W1 is conveyed from the downstream zone B out to the further downstream zone C (Refer to FIGS. 8A and 8B).

When the work W1 is conveyed to the zone C and further downstream at the standard, maintained conveying speed Vn, the work W2 in the zone A is also conveyed to downstream at the standard, maintained speed Vn. Thereby, when the sensor SC in the zone C detects the work W1, the zone controller 10 for the zone D starts operation of the driving roller 4a at the first conveying speed V1 (Refer to FIGS. 8B, 9C and 9H).

The zone controller 10 for the zone D starts to count the rotation number of the motor 11 by the counting means 60, upon starting operation of the driving roller 4a (Refer to FIGS. 8B, 9C and 9G).

More specifically, this situation occurs on the way that the work W1 is being conveyed from the zone C to the downstream zone D, thus the zone D starting and maintaining operation of the driving roller 4a at the first speed V1 over a time interval for the purpose of receiving the work W1 conveyed from the zone B.

On the way that the work W1 is conveyed from the zone C to the zone D, when obtaining the predetermined integrated value of the rotation number counted at the counting means 60 in the zone D, the zone controller 10 for the zone D reduces the conveying speed of the driving roller 4a from the first conveying speed V1 to the second conveying speed V2 (Refer to FIGS. 8B, 8C, 9G and 9H).

More specifically, this situation occurs on arrival of the work W1 at the predetermined position P in the zone D, thus reducing the conveying speed from the first speed V1 to the second speed V2 that is maintained over a time interval for preparation of a halt of conveyance.

Figure 8E:
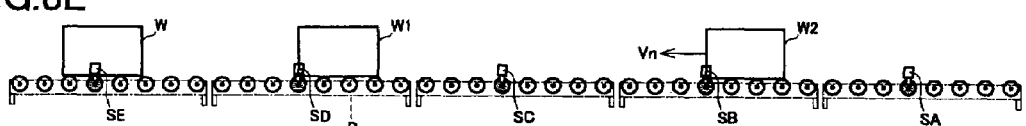
FIG. 8E is a diagram illustrating a fifth conveying state continuing to the state shown in FIG. 8D.
Figure 8F:
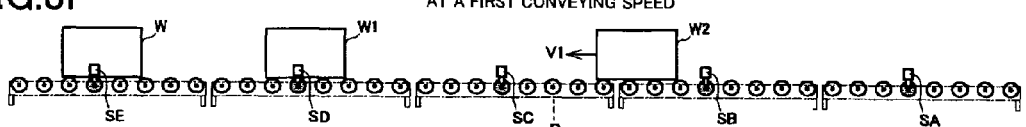
FIG. 8F is a diagram illustrating a sixth conveying state continuing to the state shown in FIG. 8E.
Figure 8G:
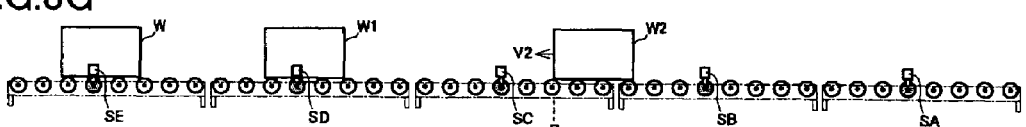
FIG. 8G is a diagram illustrating a seventh conveying state continuing to the state shown in FIG. 8F.

During conveyance of the work W1 in the zone D at the second conveying speed V2, when the sensor SD in the zone D detects its presence signal, the zone controller 10 halts operation of the driving roller 4a (Refer to FIGS. 8E, 9F and 9H). According to the halt of operation, the driving roller 4a reduces the speed to stop, thus stopping the work W1 at the position slightly downstream of the detecting position by the sensor SD (Refer to FIG. 8F).

On the other hand, the work W2 is conveyed from the zone A to the zone B during the operation for stopping the work W1 in the zone D. Thereby, when the sensor SB in the zone B detects the work W2, the zone controller 10 for the zone C starts operation of the driving roller 4a at the first conveying speed V1 (Refer to FIGS. 8C to 8E, 9A and 9E).

The zone controller 10 for the zone C starts to count the rotation number of the motor 11 based on a detection signal from the counting means 60, upon starting operation of the driving roller 4a (Refer to FIGS. 8E, 9A and 9D).

More specifically, this situation occurs on the way that the work W2 is being conveyed from the zone B to the downstream zone C, thus the zone C starting operation of the driving roller 4a at the first speed V1 for the purpose of receiving the work W2 conveyed from the zone C.

As well as the work W1, on the way that the work W2 is conveyed from the zone B to the zone C, when obtaining the predetermined integrated value of the rotation number counted at the counting means 60 in the zone C, the zone controller 10 for the zone C reduces the conveying speed of the driving roller 4a from the first speed V1 to the second conveying speed V2 (Refer to FIGS. 8F, 8G, 9D and 9E).

More specifically, this situation occurs on arrival of the work W2 at the predetermined position P in the zone C, thus reducing the conveying speed from the first speed V1 to the second speed V2 for preparation of a halt of conveyance.

Figure 8H:
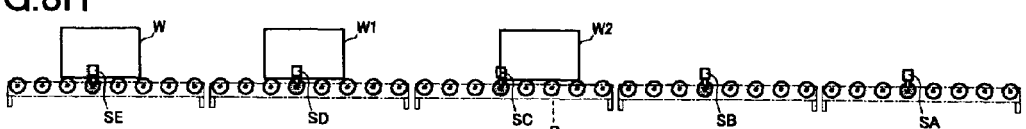
FIG. 8H is a diagram illustrating a eighth conveying state continuing to the state shown in FIG. 8G.
Figure 8I:
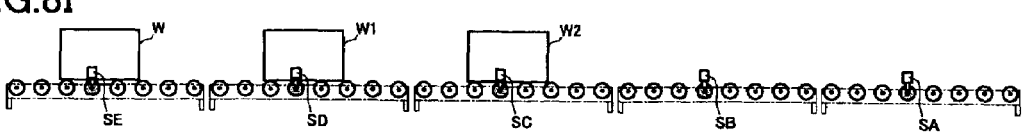
FIG. 8I is a diagram illustrating a state in which the articles are stopped continuing to the state shown in FIG. 8H.

During conveyance of the work W2 in the zone C at the second speed V2, when the sensor SC in the zone C detects its presence signal, the zone controller 10 halts operation of the driving roller 4a (Refer to FIGS. 8H, 9C and 9E). According to the halt of operation, the driving roller 4a reduces the speed to stop, thus stopping the work W2 at the position slightly downstream of the detecting position by the sensor SC (Refer to FIG. 8I).

While conveyance of the work W to downstream is forbidden in the zone E in downstream end, the control for stopping described above is performed. Restarting conveyance of the work W resting in the zone E to downstream ceases a series of the control for stopping and restarts conveyance at the standard speed Vn in each of the zones set in the conveyance mode respectively.

Applying the present invention achieves a stable control for stopping of continuous conveyance of more than two works W one after another by setting a control zone further upstream of the zone A to the singulation mode, though the conveyor line 1 shown in FIG. 8A exemplifies the process of conveying two works W.

The conveyor system 1 in FIG. 8A effects a stable control for stopping, sequentially repositioning the zones for stopping works W to upstream. Consequently, as well as shown in FIG. 6A, the inertial force acting on work W along with stopping operation is extremely reduced, thereby enabling the stop position of work W to be stabled, compared with an abrupt stop of conveyance at the standard conveying speed Vn, further protecting work W from slipping on the driving roller 4a, thereby stopping substantially exactly at the target position.

Though the above embodiment, as seen in FIG. 2, involves the zone controller 10 switching the conveying speed from the first speed V1 to the second speed V2 in response to the rotation number of the motor 11 counted by the counting means 60, the embodiments are not limited to such a construction.

Figure 10:
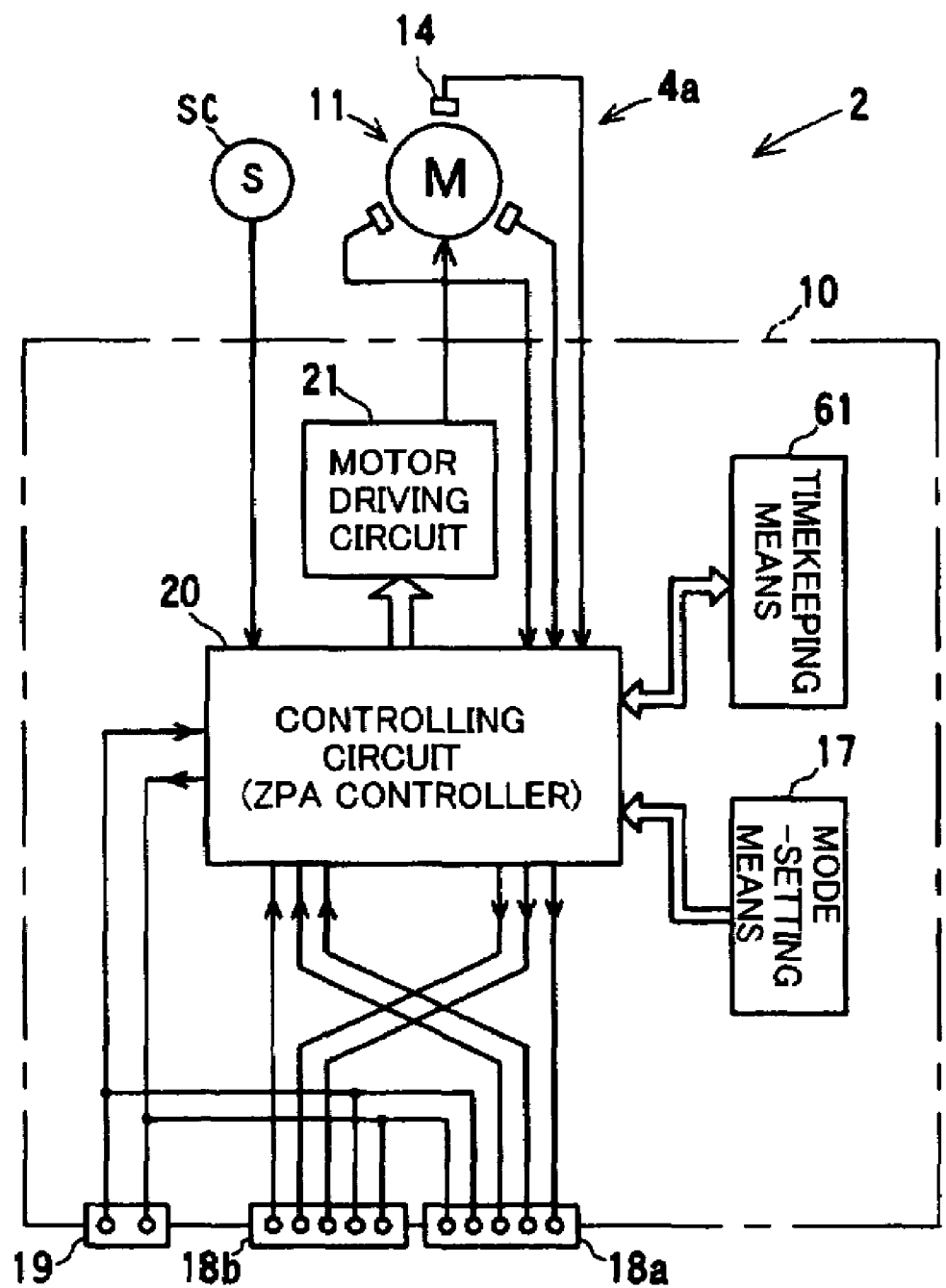
FIG. 10 is a block diagram of another embodiment of a zone controller shown in FIG. 2.

For example, as shown in FIG. 10, the zone controller 10 may be provided with a timekeeping means 61 for keeping time, whereby assuming an arrival of an article at the predetermined position P in the zone after passage of a predetermined time from detecting a presence signal in the upstream zone to switch to the second speed V2.

Figure 11:
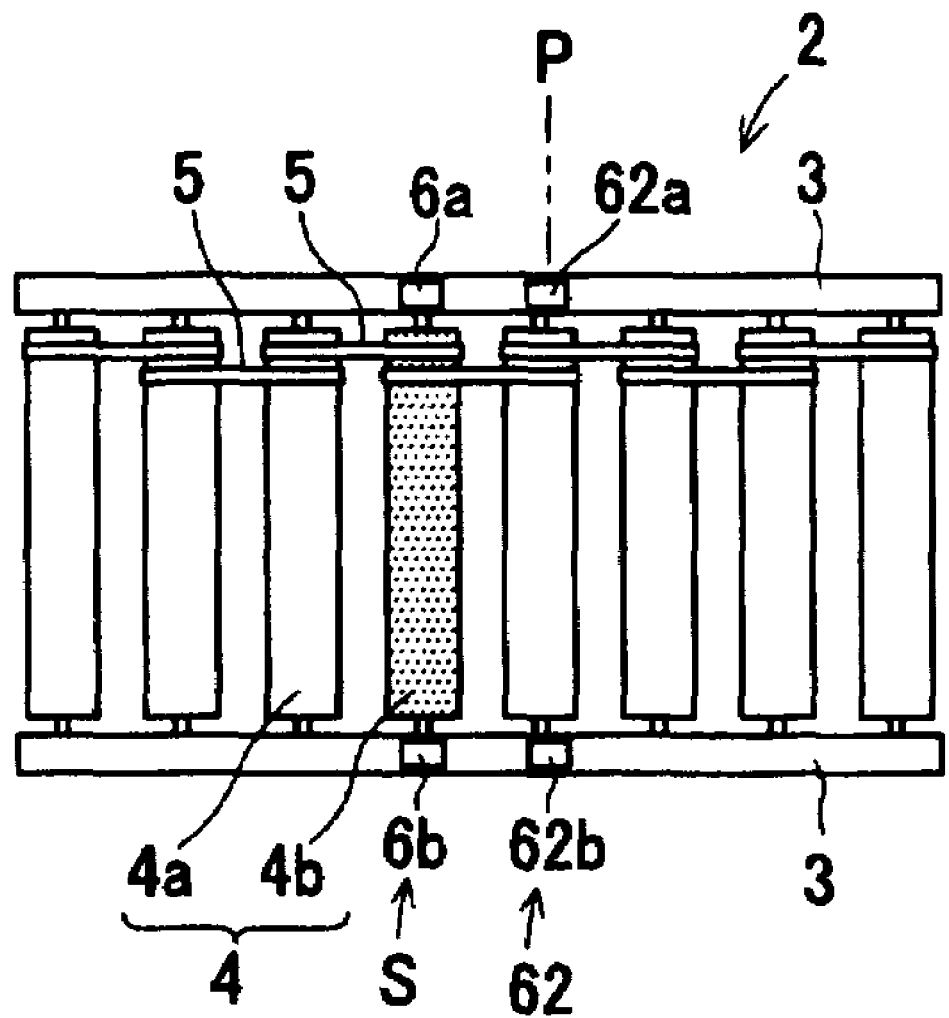
FIG. 11 is a plan view of another embodiment of a conveyor unit shown in FIG. 1A.

Further, as shown in FIG. 11, each of the conveyor units 2 may be provided with a position sensor 62 formed by a combination of a light-emitting element 62a and a light-receiving element 62b at the position P where the conveying speed of work W is reduced from the first speed V1 to the second speed V2. This arrangement makes sure to switch to the second speed V2 at the predetermined position P even if work W slips on the conveying rollers 4 upstream of the position P, thereby enabling a further stable control for stopping.

Though the conveyor line 1 shown in FIG. 8A involves the zone A set in the singulation mode, the invention is not limited to such a construction. As seen in FIG. 2, the conveyance mode of the zone controller 10 for each zones may be switchable by the supervisory controller 50, thereby sequentially switch and set necessary zones in the singulation mode with monitoring conveying states of articles by the supervisory controller 50.

Though, in the embodiments described above, the zone controller 10 continues to operate the driving roller 4a at the first speed V1, and reduces its speed to the second speed V2 upon arrival of work W at the predetermined position P, thereby rendering a control for stopping, it is also possible to reduce the speed from the first speed gradually or stepwise as work W approaches to the predetermined position P.

The embodiments control reducing of the conveying speed of the driving roller 4a from the first speed V1 to the second speed V2 by the zone controller 10 for stopping work W. A preferred embodiment of the zone controller 10 for such a control for reducing stably the speed of the driving roller 4a will be described below, referring to FIG. 12.

Figure 12:
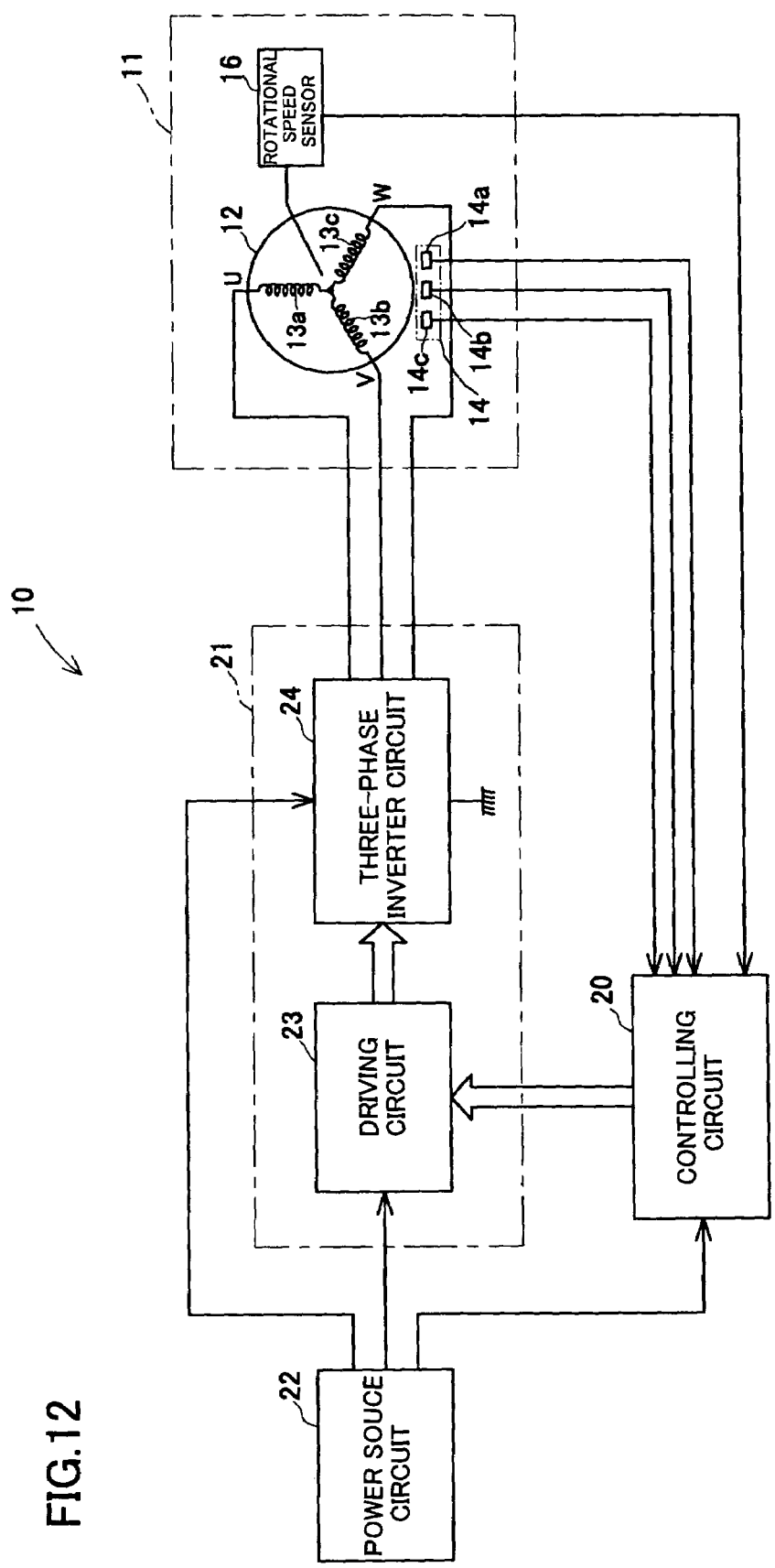
FIG. 12 is a block diagram showing a driving system including the driving motor 11 and the zone controller 10 in each of the zones shown in FIG. 2.

As seen in FIG. 12, a driving system for driving a brushless motor relating to the embodiment consists essentially of a three-phase brushless motor 11 and the zone controller 10 for a driving control thereof. The zone controller 10 includes a controlling circuit 20, a motor driving circuit 21 and a power source circuit 22. The brushless motor 11 includes a motor body 12, a pole-position detector (viz. Hall effect sensor) 14 and a rotational speed sensor (viz. a counting means for a rotation number) 16. The motor body 12 is designed to have an outer rotor (not shown) with an inner stator, and magnetic coils 13a, 13b and 13c wound around three slots (or phases) U, V and W of the stator respectively. Though the brushless motor 11 exemplified in the embodiment is of two-pole and three-phase type, with three coils, motors for use is not limited to this type. For example, the brushless motor 11 may have more than three coils.

The pole-position detector 14 constituted by Hall effect sensors 14a, 14b and 14c has the function of detecting the pole position of the rotor of the brushless motor 11 so as to generate a detection signal. The rotational speed sensor 16 has the function of sensing the rotational speed of the rotor so as to output signals indicating the rotational speed such as pulses in response to the rotation of the rotor, and is, for example, constituted by a rotary encoder. However, the rotational speed sensor 16 may be constituted by a calculation using the detection signal from the pole-position detector 14.

The driving system is directed to effect a rotation control and/or a braking control by controlling application of a current to the brushless motor 11 by means of the motor driving circuit 21 in response to driving and braking signals generated at the controlling circuit 20. Herein, the term "rotation control" denotes the control for rotating the rotor and the term "braking control" denotes the control for restraining the rotation of the rotor.

The zone controller 10 generates the driving signal by means of the controlling circuit 20 so as to sequentially switch application of the current to at least one coil selected from the coils 13a, 13b and 13c of the brushless motor 11.

More specifically, for the rotation control, the controlling circuit 20 receives the detection signal indicating the rotational position of the rotor detected at the pole-position detector 14, generates the driving signal in response to the detection signal, and outputs the driving signal to the motor driving circuit 21.

The motor driving circuit 21 includes a driving circuit 23 and a three-phase inverter circuit 24, the driving circuit 23 being adapted to processing the driving and braking signals transmitted to the controlling circuit 20 and generating a signal adaptable to the three-phase inverter circuit 24.

The motor driving circuit 21 effects the rotation control of the rotor of the brushless motor 11 by sequentially switching application of a current to each of the coils 13a, 13b and 13c upon reception of and in response to the driving signal. In the example shown in FIG. 12, the current is applied to two coils selected form the three coils 13a, 13b and 13c simultaneously and the selection thereof are sequentially switched.

For the braking control to reduce the speed of the motor 11, the controlling circuit 20 generates the braking signal in response to the rotational speed sensed at the rotational speed sensor 16, and outputs the braking signal to the motor driving circuit 21 with the driving signal described above.

The motor driving circuit 21 effects the braking control by applying a current to at least one coil not being excited, except the coils being excited under the rotation control. In the example shown in FIG. 12, one coil not being excited among the three coils 13a, 13b and 13c is excited. The braking control generates an electromagnetic force to control the rotation of the rotor, thereby reducing the speed of the rotation.

The zone controller 10 in this embodiment shifts the conveying speed smoothly to a target speed, restraining a change of the speed by an external force such as an inertial force acting on a work, thereby enabling a braking control extremely stably.

The driving circuit 23 accommodated in the motor driving circuit 21 may be, for example, constituted by a logical circuit. It is also possible to generate similar signals by a program processing by using CPU.

The three-phase inverter circuit 24 accommodated in the motor driving circuit 21 may be, for example, constituted by a MOSFET. It is also possible to be constituted by a junction transistor, a thyristor and so on.

The present invention is not limited to the embodiments. For example, other known electric, magnetic or mechanical brake may be used for reducing the conveying speed.

The invention claimed is:

1. A zone controlled conveyor system comprising a plurality of zones for control arranged in a row in the direction of conveyance of articles,
    each of the zones having a driving roller for generating power for conveyance, a zone controller for controlling operation of the driving roller in its associated zone, and a presence sensor for outputting a presence signal upon detection of an article,
    wherein each of the zone controllers is adapted to receive signals for controlling operation of the driving roller in its associated zone,
    wherein each of the zone controllers is also adapted to switch a conveying speed of an article driven by the driving roller in its associated zone among a plurality of maintainable speeds including a prescribed standard, maintained conveying speed, and
    wherein the zone controllers are arranged so that while conveyance of any article from a particular zone to a downstream zone is forbidden, the zone controller for the particular zone (a) starts operation of a driving roller in the particular zone at a first maintained conveying speed slower than the standard conveying speed upon transmission of a presence signal of an article to the zone controller from an immediately upstream zone of the particular zone, (b) operates the driving roller in the particular zone at a second maintained conveying speed slower than the first conveying speed after arrival of the article at a predetermined position in the particular zone, and (c) then halts operation of the driving roller in the particular zone when a presence signal is outputted in the particular zone.

2. The zone controlled conveyor system according to claim 1,
    wherein at least one of the zone controllers is adapted to switch the conveying speed gradually or stepwise.

3. The zone controlled conveyor system according to claim 1,
    wherein at least one of the sensors is a photoelectric sensor formed by a combination of a light-emitting member and a light-receiving member.

4. The zone controlled conveyor system according to claim 1,
    wherein at least one of the zone controllers in one of the zones is adapted to transmit a driving signal and a braking signal simultaneously to a motor for driving the driving roller in the one zone so as to reduce the conveying speed of the roller in the one zone.

5. A zone controlled conveyor system comprising a plurality of zones for control arranged in a row in the direction of conveyance of articles,
    each of the zones having a driving roller for generating power for conveyance, a zone controller for controlling operation of the driving roller in its associated zone, and a presence sensor for outputting a presence signal upon detection of an article,
    wherein each of the zone controllers is adapted to receive signals for controlling operation of the driving roller in its associated zone,
    wherein each of the zone controllers is also adapted to switch a conveying speed of an article driven by the driving roller in its associated zone among a plurality of maintainable speeds including a prescribed standard, maintained conveying speed,
    wherein each of the zone controllers comprises a mode-setting means adapted to switch mode of control between a slug mode and a singulation mode,
    operation of the driving rollers being controlled in the slug mode so that articles in the zones are conveyed uniformly to downstream, maintaining the order of the articles in the conveying line,
    operation of the driving rollers being controlled in the singulation mode so that articles are conveyed separately to downstream with a predetermined number of zones in which no article exists kept between the zones in which the articles exist, and
    wherein the zone controllers are arranged so that while conveyance of any article from a particular zone to a downstream zone is forbidden, and when articles are conveyed to an immediately upstream zone of the particular zone in the slug mode, the zone controller for a zone selected from zones upstream of the immediately upstream zone is switched to the singulation mode, and the zone controller for the particular zone (a) starts operation of a driving roller in the particular zone at a first maintained conveying speed slower than the standard conveying speed upon transmission of a presence signal of an article to the zone controller from an immediately upstream zone of the particular zone, (b) operates the driving roller in the particular zone at a second maintained conveying speed slower than the first conveying speed after arrival of the articles at a predetermined position in the particular zone, and (c) then halts operation of the driving roller in the particular zone when a presence signal is outputted in the particular zone.

6. The zone controlled conveyor system according to claim 5,
    wherein each of the zone controllers is connected to a supervisory controller adapted to output a mode-switching signal according to conveying states of articles so that each of the zone controllers is automatically switchable between the slug mode and the singulation mode on receiving the mode-switching signal transmitted from the supervisory controller.

7. The zone controlled conveyor system according to claim 5,
    wherein at least one of the zone controllers is adapted to switch the conveying speed gradually or stepwise.

8. The zone controlled conveyor system according to claim 5,
    wherein at least one of the sensors is a photoelectric sensor formed by a combination of a light-emitting member and a light-receiving member.

9. The zone controlled conveyor system according to claim 5,
wherein at least one of the zone controllers in one of the zones is adapted to transmit a driving signal and a braking signal simultaneously to a motor for driving the driving roller in the one zone so as to reduce the conveying speed of the roller in the one zone.

10. A zone controller for use in a conveyor system having a plurality of zones for control arranged in a row in the direction of conveyance of articles and provided in one of the zones,
wherein the zone controller is for controlling operation of a driving roller for generating power for conveyance provided in the zones,
wherein the zone controller is adapted to receive presence signals from presence sensors provided in a particular zone having the zone controller and an immediately upstream zone of the particular zone each for outputting a presence signal upon detection of an article,
wherein the zone controller is also adapted to switch a conveying speed of an article driven by the driving roller in the particular zone among a plurality of maintainable speeds including a prescribed standard, maintained conveying speed, a first conveying speed slower than the standard conveying speed and a second conveying speed slower than the first conveying speed, and
wherein the zone controller is arranged so that while conveyance of any article from the particular zone to a downstream zone is forbidden, the zone controller for the particular zone (a) starts operation of the driving roller in the particular zone at the first conveying speed upon transmission of a presence signal of an article to the zone controller from an immediately upstream zone of the particular zone, which first conveying speed is maintained over a time interval, (b) operates the driving roller in the particular zone at the second conveying speed, which second conveying speed is maintained over a time interval after arrival of the articles at a predetermined position in the particular zone, and (c) then halts operation of the driving roller in the particular zone when a presence signal is outputted in the particular zone.

11. The zone controller according to claim 10, further comprising a mode-setting means adapted to switch between a slug mode and a singulation mode,
wherein in the slug mode operation of the driving roller in the particular zone is controlled so that articles in the zones are conveyed uniformly to downstream, maintaining the order of the articles in the conveying line, and
wherein in the singulation mode operation of the driving roller in the particular zone is controlled so that articles are conveyed separately to downstream with a predetermined number of zones in which no article exists kept between the zones in which the articles exist.

12. The zone controller according to claim 11,
wherein the zone controller is adapted to output the presence signal from the sensor of the particular zone and a driving status signal that indicates a driving status of the driving roller in the particular zone to the immediately upstream and downstream zones;
wherein the zone controller for the particular zone set in the slug mode conveys uniformly the articles referring to the presence signal of the particular zone, the presence signals outputted from the immediately upstream and downstream zones of the particular zone, and the driving status signal outputted from the immediately downstream zone of the particular zone; and
wherein the zone controller for the particular zone set in the singulation mode conveys separately the articles referring to the presence signal in the particular zone and the presence signals outputted from the immediately upstream and downstream zones of the particular zone.

13. The zone controller according to claim 11,
wherein the zone controller is connected to a supervisory controller for monitoring conveying states of articles in a plurality of zones so as to output a mode-switching signal according to the states; and
wherein the zone controller automatically switches between the slug mode and the singulation mode in response to the mode-switching signal transmitted from the supervisory controller.

14. The zone controller according to claim 10,
wherein the zone controller is adapted to switch the conveying speed gradually or stepwise.

15. The zone controller according to claim 10,
wherein the zone controller sets the first conveying speed to substantially a mean value between the standard and the second conveying speeds.

16. The zone controller according to claim 10, further comprising a means for counting a rotation number of one selected from the roller and a motor driving the roller;
wherein the zone controller assumes an arrival of an article at the predetermined position in the particular zone when obtaining a predetermined integrated value of the rotation number counted by the counting means after starting driving the roller in the particular zone at the first conveying speed.

17. The zone controller according to claim 10, further comprising a timekeeping means;
wherein the zone controller assumes an arrival of an article at the predetermined position in the particular zone after passage of a predetermined time from starting driving of the roller in the particular zone at the first conveying speed.

18. The zone controller according to claim 10, further comprising a position sensor for detecting an arrival of an article at the predetermined position;
wherein the zone controller perceives the arrival when receiving a position signal from the sensor.

19. The zone controlled conveyor system according to claim 10,
wherein at least one of the sensors is a photoelectric sensor formed by a combination of a light-emitting member and a light-receiving member.

20. The zone controller according to claim 10,
wherein the zone controller is adapted to transmit a driving signal and a braking signal simultaneously to a motor for driving the driving roller in the particular zone so as to reduce the conveying speed of the driving roller in the particular zone.

* * * * *